(12) United States Patent
Ealer

(10) Patent No.: US 7,609,949 B2
(45) Date of Patent: Oct. 27, 2009

(54) PORTABLE FLAG AND NET KIT

(76) Inventor: John S. Ealer, 11680 Montana Ave., #301, Los Angeles, CA (US) 90049

( * ) Notice: Subject to any disclaimer, the term of this patent is extended or adjusted under 35 U.S.C. 154(b) by 317 days.

(21) Appl. No.: 11/706,420

(22) Filed: Feb. 15, 2007

(65) Prior Publication Data

US 2007/0201844 A1  Aug. 30, 2007

Related U.S. Application Data

(60) Provisional application No. 60/773,317, filed on Feb. 15, 2006.

(51) Int. Cl.
| | |
|---|---|
| G03B 15/02 | (2006.01) |
| G03B 15/00 | (2006.01) |
| F21V 17/02 | (2006.01) |
| F21V 17/00 | (2006.01) |
| A47F 5/00 | (2006.01) |
| A47F 7/00 | (2006.01) |
| F16M 11/00 | (2006.01) |
| F16M 13/00 | (2006.01) |

(52) U.S. Cl. ............... 396/4; 396/5; 362/18; 362/320; 362/450; 248/122.1; 248/513

(58) Field of Classification Search .......... 396/4, 396/5; 362/6, 16, 18, 320, 450; 248/122, 248/122.1, 513
See application file for complete search history.

(56) References Cited

U.S. PATENT DOCUMENTS

| | | | | | |
|---|---|---|---|---|---|
| 3,852,582 | A | * | 12/1974 | Lowell | 362/6 |
| 4,544,120 | A | * | 10/1985 | Lowell et al. | 248/122.1 |
| 5,235,368 | A | * | 8/1993 | Oglesbee | 396/4 |
| 5,436,804 | A | * | 7/1995 | Henry | 362/16 |
| 5,924,669 | A | * | 7/1999 | Richins | 248/513 |
| 6,234,638 | B1 | * | 5/2001 | Beverly | 362/16 |

OTHER PUBLICATIONS

Barn Door Lighting Outfitters, http://www.filmandvideolighting.com/, no date.*

* cited by examiner

*Primary Examiner*—Melissa J Koval
(74) *Attorney, Agent, or Firm*—J. Andrew McKinney, Jr.

(57) ABSTRACT

A durable, portable for the lighting or imaging professional includes at least a first collapsible frame adapted to support a light modifying flag or a light modifying net. The collapsible frame includes first and second rigid frame components 22, 24 carrying fixed hinge pins 38 that connect to first and second foldable frame components. The collapsible frame defines frame components with frame ends and the kit includes at least one light modifying flexible material segment with frame end receiving portions. The collapsible frame has a first erected size and the flexible material segment has a second size not greater than said first size so that the collapsible frame, when erected, permits a user to place the flexible material flag or net under tension upon the frame.

18 Claims, 7 Drawing Sheets

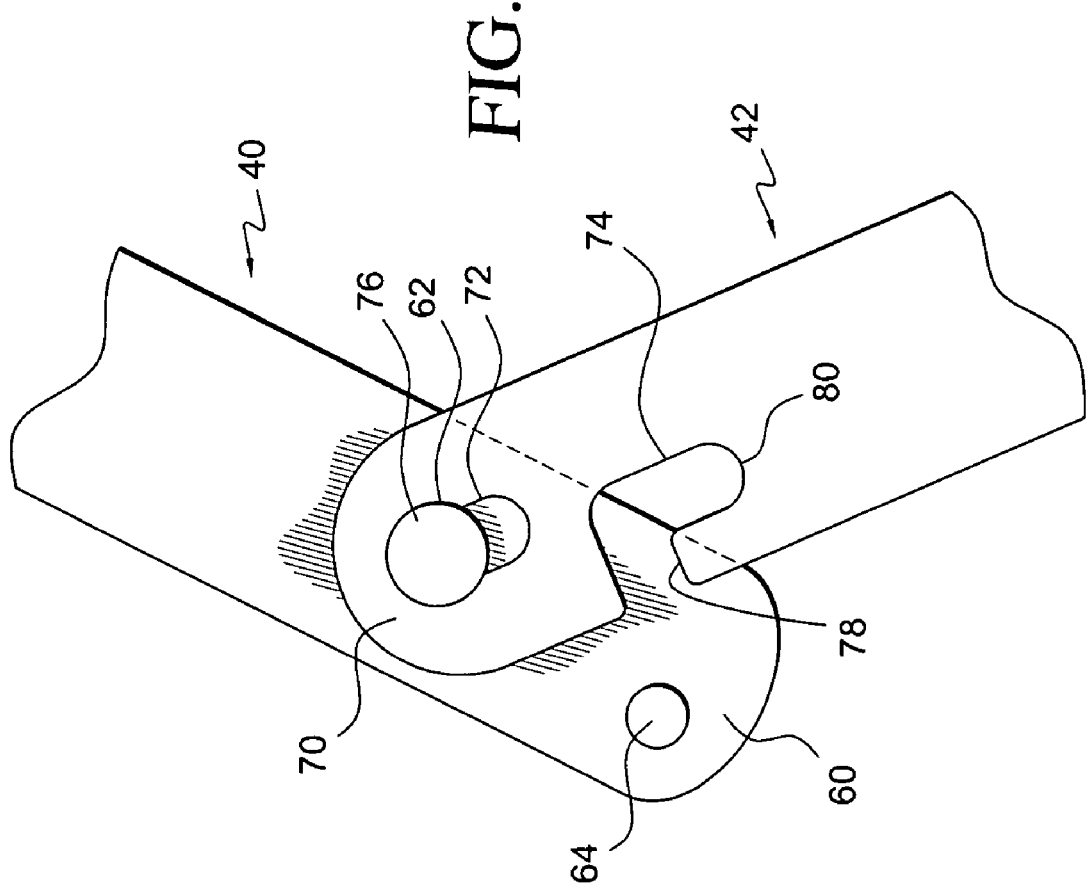

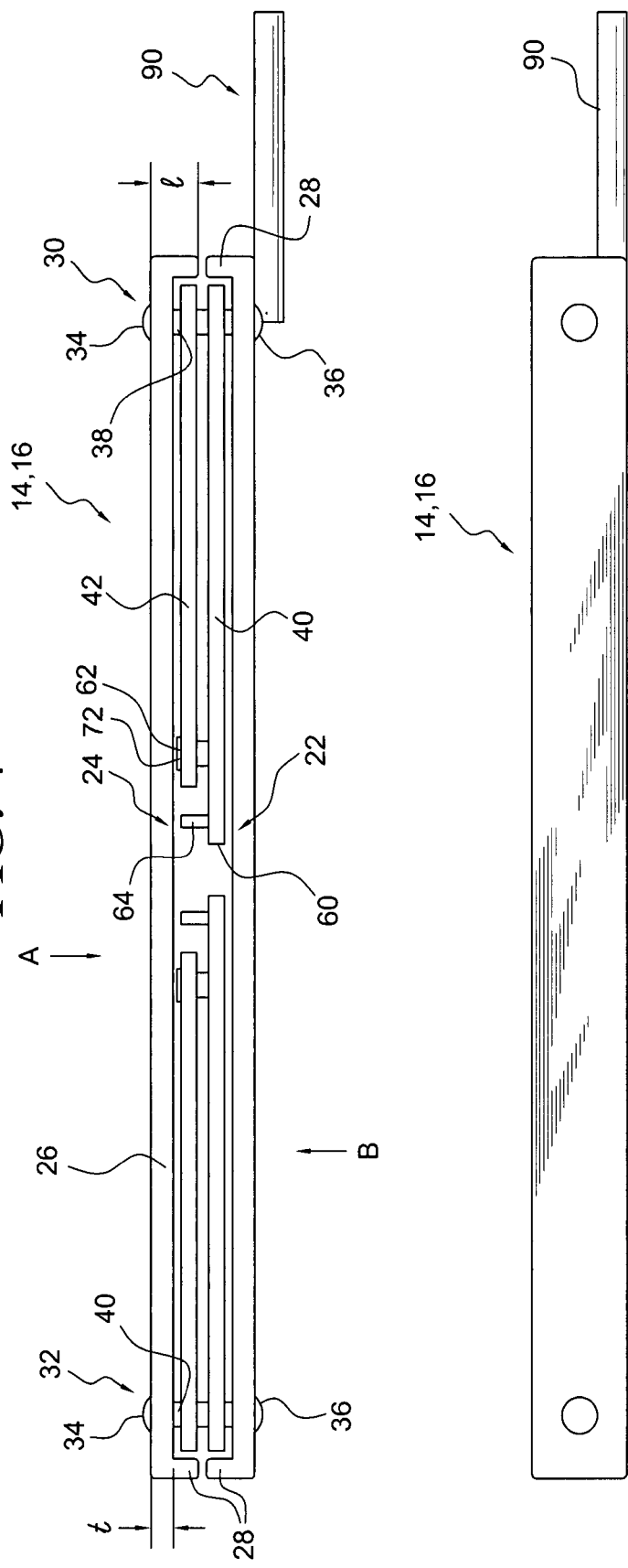

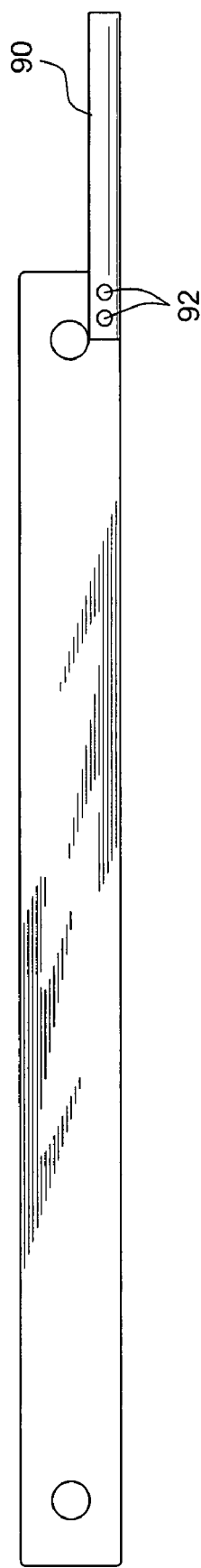
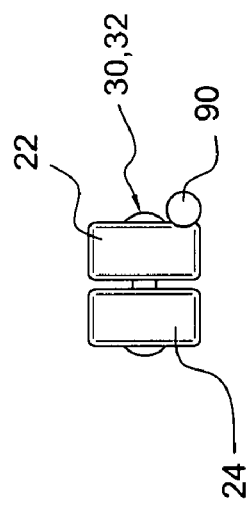
FIG. 6
FIG. 7

PORTABLE FLAG AND NET KIT

This application is a continuation of/is related to/claims priority to the filing date of U.S. provisional application Ser. No. 60/773,317, filed Feb. 15, 2006, the entire disclosure of which is incorporated herein by reference.

BACKGROUND OF THE INVENTION

1. Field of the Invention

The present invention relates to adaptable, transportable structures used to shape, modify, alter, reflect or block light, also known as grip equipment, used by lighting and imaging professionals.

2. Discussion of the Prior Art

Grip equipment is a general term used by lighting and imaging professionals to refer to any type of instrument that shapes, modifies, alters or blocks light in any way. Grip equipment also refers to the stands, mounting hardware and other accoutrements that hold this light-shaping or light-modifying equipment in a desired location or configuration so it can perform its light-modifying task.

Flags and nets are an integral part of a grip toolkit. Comprised of various types of fabrics and materials stretched over metal frames, they enable a photographer, videographer, cinematographer, imaging professional or lighting designer to control the quality, intensity, color or shape of a natural or artificial light source.

Types of Flags and Nets

Although there are many kinds of fabrics and materials used on flags and nets for various effects, among the most common types are as follows:

1. Silks: A translucent white or black fabric that diffuses or spreads light.
2. Diffusions: Similar to a silk, these white fabrics diffuse and spread light in varying degrees depending on the density of the material.
3. Solids: A heavy, opaque black fabric that blocks all light.
4. Scrims: A thin net, usually used in single, double, or triple layers to reduce the intensity of light without changing its color or shape.
5. Bounces: A bright white, reflective fabric that literally bounces light to provide additional illumination.
6. Metallics: Gold or silver metallic surfaces that reflect light.
7. Breakup Patterns: Often referred to as a "cucoloris" (the origin of the name is lost to the lore of the early motion picture industry), these breakup patterns create patterns of shadow and light. Some cucoloris are made of wire mesh, others are actually made of wood with holes cut out.
8. Empty Frames: Empty frames (without any fabric or material) generally serve an important purpose in allowing the user to customize a frame for a very specific use by adding task-specific gels or diffusion. First, colored gels can be attached to them to modify the color of a light source. Second, heat shield gels or UV gels can be used on the frame to protect the objects being lit from heat or UV rays. Third, different kind of materials (often paper-like diffusion) can be put on the frame to achieve different light-modifying effects.

Flags and nets come in various sizes, the most common of which are 18"×24" and 24"×36" and 48"×48". Sizes smaller than this are referred to "fingers" and "dots" in the industry vernacular, larger sizes are traditionally referred to as "butterflies" or "overheads."

There are two important subtypes of flags and nets: closed-ends and open-ends. Closed-ends have a four-sided metal frame and the material is stretched tight and sewn to all four sides. Open-ends have a three-sided frame with the fourth side of replaced by a thin metal wire that holds the fabric in place. Open-end configurations are usually only used for nets and silks. This configuration has the advantage of being able to "feather" the shadow line of the flag or net more subtly because there's no metal frame to block light. The image labeled Example 2 shows open-ended nets.

Another important subtype of flags are called "floppies." "Floppies" are almost always solids, and feature an extra layer of fabric attached to the main layer along one edge. This extra layer is held flat against the main layer of fabric with Velcro. When needed the extra layer of fabric can be "flopped" down by pulling apart the Velcro to double the surface area of the solid. Example 4 shows a 4×4 floppy solid in the "flopped" position.

Traditional Flag Design

Whether open or closed-end, floppy or non-floppy, the materials in traditional flags and nets are permanently sewn onto a metal frame that is either made of flat aluminum or solid metal rods. While this design is relatively sturdy and works well for studio applications, there are several significant drawbacks to this approach.

Foremost, this traditional design necessitates that you have one frame for every kind of fabric that you want to use. For example, if you want to have a flag and net kit that includes a silk, a solid, a single scrim, a double scrim, and a bounce, you need to have five frames, each with the appropriate permanently sewn-on material. In any given lighting set-up, there is little chance that the lighting professional will need to use all five of these at once, yet because the materials are permanently attached to the frames, the lighting professional must transport (and store) all these frames, all the time.

Storing and transporting these redundant frames is heavy and an inefficient use of space. While these considerations may not be important to large studio applications, they are critical to the reality television, documentary, news, independent, and student-film sectors.

But even in studio applications, there still one significant drawback to traditional flags and nets. Since the fabrics are stretched tight across the frame all the time, they are very vulnerable to being ripped or torn if handled or stored improperly. Most damage to flags and nets actually occurs when they are being taken into and out of the flag boxes traditionally used to store them, as one metal frame will often puncture the fabric on the frame next to it if the person storing the flags does not exercise appropriate care. Also, simply the action of taking flags and nets out of their storage cases results in significant wear and tear on the edges of the fabrics, wear that over time leads to tearing in the fabric.

Others have created portable flag and net systems, but each is deficient in several critical ways. First, Matthews Studio Equipment has a product called the Road Rags™ products based on a tent pole-like tubing with elastic inside. While light and compact, this design has many deficiencies, including:

1. Unfamiliar form factor. It's not in the common rectangular shape expected by industry professionals. Further-more, the handle to attach the flag to a stand is located in the middle of the long side of the frame—a totally unfamiliar design.
2. Weak. The tent-pole tubing, while light, is not very stiff, nor very strong. It is very susceptible to being broken or bent by any accidental application of force.
3. No floppies. Since the frame isn't very strong, it can't support the additional weight of floppies.
4. Slower. The fabrics must be slid onto the frame and then attached with four clasps, which is a slow process. Also, it's not possible to attached multiple fabrics to one frame.

Another vendor, Westcoft, has a product called Fast Flags™. While the form factor is not an issue with the Westcott product, weakness, slowness and lack of durability are three major deficiencies of the product.

There is a need, therefore, for a set of portable flag and net equipment adapted to overcome the deficiencies of the prior art.

SUMMARY OF THE INVENTION

An object of the present invention is overcoming the deficiencies of the prior art by providing a durable, easy to use set of portable flag and net equipment that has the strengths of the traditional frames, but provides greater portability and durability.

The weight, space, and repair needs associated with traditional frames could all be abated if their design could accommodate two additional criteria:
1. Separability: The materials attached to the frames could be quickly and easily attached and detached and stored separately from the frames. Not always under the stress and tension of being stretched across the frame, the materials would be far less prone to tearing and damage during storage.
2. Collapsibility: The frames themselves could be quickly and easily folded up and stored in a collapsed state, and just as easily and quickly unfolded and ready for use. The collapsible nature of the frame should not, however, significantly diminish the strength or stiffness of the frame, nor should it result in a form factor that is unfamiliar to the industry professional.

The portable flag and net kit of the present invention combines all the functionality of traditional flags and nets with these critical qualities of separability and collapsibility, thereby bringing an unprecedented level of portability to studio-quality light control tools. The portable flag and net kit of the present invention can accommodate any of the traditional sizes of flags and nets, and is based on materials familiar to the industry professional. Also, the components of the portable flag and net kit of the present invention are modular, which decreases the number of unique parts, reducing manufacturing costs.

The portable flag and net kit of the present invention is based on a collapsible frame preferably constructed of flat aluminum rail or bar segments of varying widths or other appropriate materials like plastics or composites.

The exact dimensions and composition of the parts will vary, depending on the size of the frame. An exemplary embodiment provides an 18"×24" flag. All the major structural components of this embodiment are aluminum, though other materials could be used. The frame comprises a rectangle having first and second long rail bodies carrying hinges on each end, and two pairs of shorter rail segments, each pair hinged with two short segments together to define a short side of the rectangle. The longer rail bodies provide the long sides of the substantially rectangular frame and are 24" long, 1" wide and approximately ⅛" thick. Each end of a long rail body has a small ¼" tab on the end bent at a 90 degree angle to the plane of the rail.

For rectangular embodiments, the shorter sides of the frame are made of two pairs of shorter rail segments, each hinged together at the middle. Each pair of shorter rail segments includes a pin frame member hingedly connected to a slot frame member, and each pin frame member is about ten inches long, ¾" wide, and about ⅛" thick. Each pin frame member has a locating pin attached near the hinged end that protrudes approximately ⅛" above the surface of the frame member. The end of each pin frame member that attaches to its corresponding slot frame member is half-rounded and the location of the pin is oriented to releasably engage an L-shaped slot in the slot frame member and then lock into a co-linear, rigid position. A hinge, in the case, an aluminum rivet, connects part each pin frame member to its slot frame member. The slot frame member is similar to the pin frame member, since it is about 9.5" long, ¾" wide, and ⅛" thick. The "L-shaped" locating slot complements the locating pin found on the pin frame member. A small ¼" long slot hinge near the top of the slot frame member permits the hinge connect and then lock the slot frame member to the pin frame member. This slot allows the hinge (again, a rivet) to "slide" approximately ¼" of an inch. When the slot frame member and the pin frame member are pushed toward one another, the sliding hinge allows the locating pin on the slot frame member to snap into the lower part of the "L-shaped" locating slot, locking the short rail segments in place. When parts the slot frame member and the pin frame member are pulled apart, the hinge slides back and allows the locating pin to slide out of the locating slot, permitting the slot frame member and the pin frame member to fold together. The left and right slot frame members are attached to the bottom side of the frame or bottom rail body in the same way as the top side of the frame is attached to the left and right pin frame members.

A handle or mount rod is a solid metal rod screwed on to the top of the frame or top elongated rail body. The mount rod is ⅜" in diameter, 4-5 inches long and is the "handle" through which the frame is mounted on grip stands.

When the frame is being folded, the sliding hinge between the slot frame member and the pin frame member allows the locating pin to slide up and out of the L-shaped slot. When the frame is completely folded, the bend tab ends, plus the half-rounded ends of the slot frame members and the pin frame members, ensure that it's impossible to open the frame of the present invention in the wrong way.

In accordance with the structure and method of the present invention, the frame is adapted to carry removable attachable fabric elements including a perimeter of webbing about ¾" wide sewn to the edge of selected light modifying material (e.g., a silk, solid, net, bounce, etc.) Elastic corners are sewn to the webbing. The assembled flag or net is then stretched so that the elastic corners slip over the corners of the metal frame. A slight bit of tension from the fabric elements, once stretched across the assembled frame, ensures that the locating pin on the frame stays in the locked position.

The advantages of the portable flag and net kit of the present invention include:
1. Speed. The portable flag and net kit of the present invention can be assembled and be ready for use in seconds.
2. Simplicity. One flick of the wrist can open and close the collapsible frame. There is no assembly required, as all parts of the frame are permanently attached—there are no parts to store or worry about losing. Also, it can't be opened the wrong way.

3. Compactness. The collapsed frame is very small and easy to carry and transport. The folded frame can fit into standard-sized lighting equipment cases as well as many kinds of common suitcases.

4. Strength. The assembled frame is very strong and resistant to torque and bending. It can support heavier fabrics, and also multiple layers of floppy elements.

5. Durability. Since the fabric elements of the portable flag and net kit of the present invention are not stored stretched across the frames, they are much less prone to tearing and damage. The frame itself, whether collapsed or extended, is very durable.

6. Versatility. One may change the fabric without having to remove the frame from the stand. One may also add layers without adding stands or add a gel light modifier on top of a diffusion modifier. Also, because the fabrics don't have to be permanently stretched across the frame, more delicate fabrics and materials that couldn't withstand the constant tension may be used.

7. Extensability. The basic design can be easily modified to accommodate different sizes of flags and nets. Also, an open-end style can be created by simply creating a modified version of part A that is perforated and a complementary fabric elements with wire instead of webbing of the $4^{th}$ side of the frame.

The above and still further features and advantages of the present invention will become apparent upon consideration of the following detailed description of a specific embodiment thereof, particularly when taken in conjunction with the accompanying drawings, wherein like reference numerals in the various figures are utilized to designate like components.

BRIEF DESCRIPTION OF THE DRAWINGS

FIG. 3 is an enlarged side elevation view of a portion of a hinge for the collapsible frame, in a partially folded configuration;

FIG. 4 is a top plan view of the collapsible frame of the present invention in a fully collapsed configuration;

FIG. 5 is a side elevation view of the collapsed frame of FIG. 4 taken in the direction indicated by arrow A in FIG. 4;

FIG. 6 is a side elevation view of the collapsed frame taken in the direction indicated by the arrow B in FIG. 4;

FIG. 7 is an end view of the collapsible frame, in its collapsed position;

DESCRIPTION OF THE PREFERRED EMBODIMENT

Figure 1:
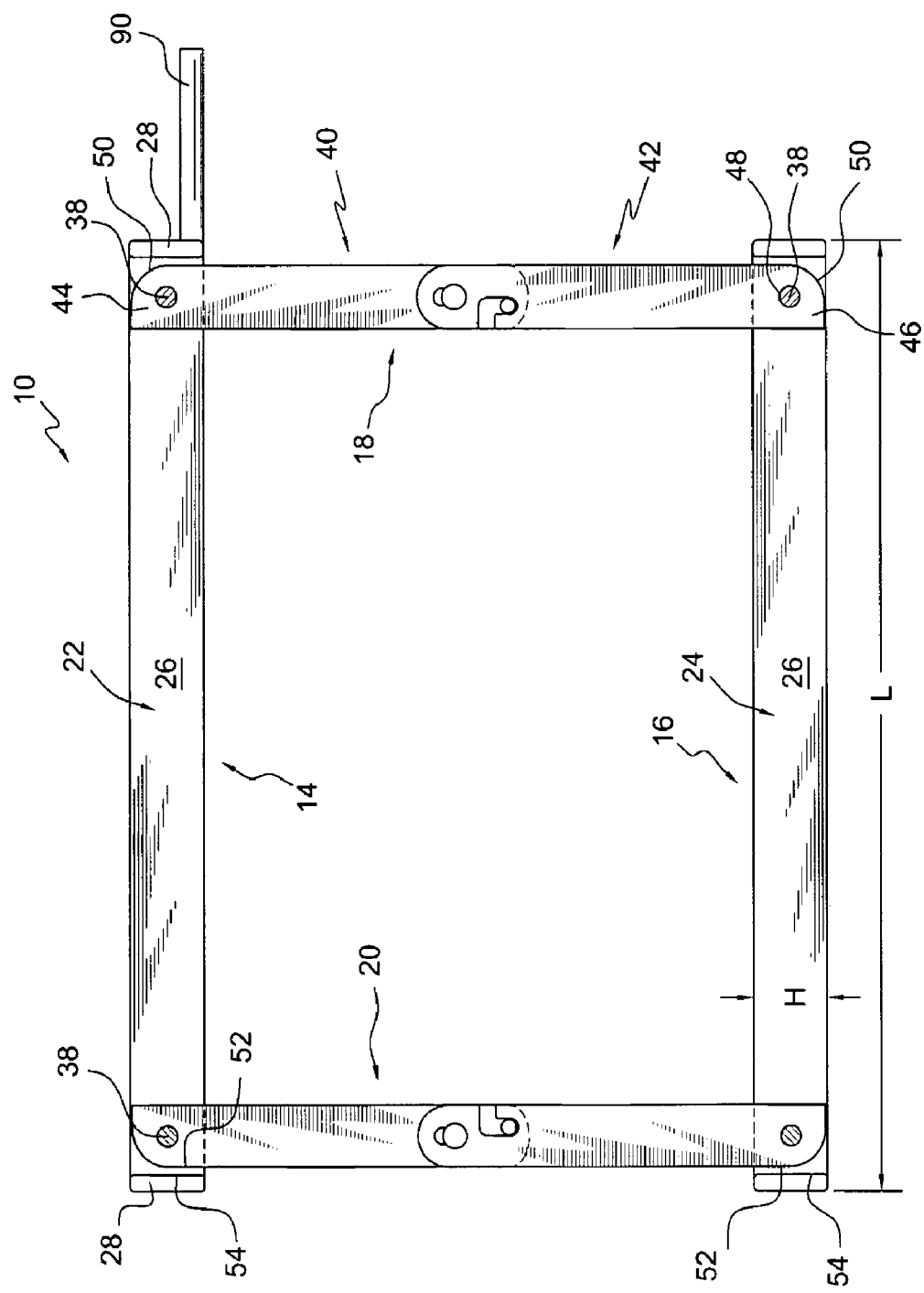
FIG. 1 is a side elevation view, with selected portions removed, of a collapsible frame of the kit in accordance with the present invention, in a use or unfolded position.
Figure 8:
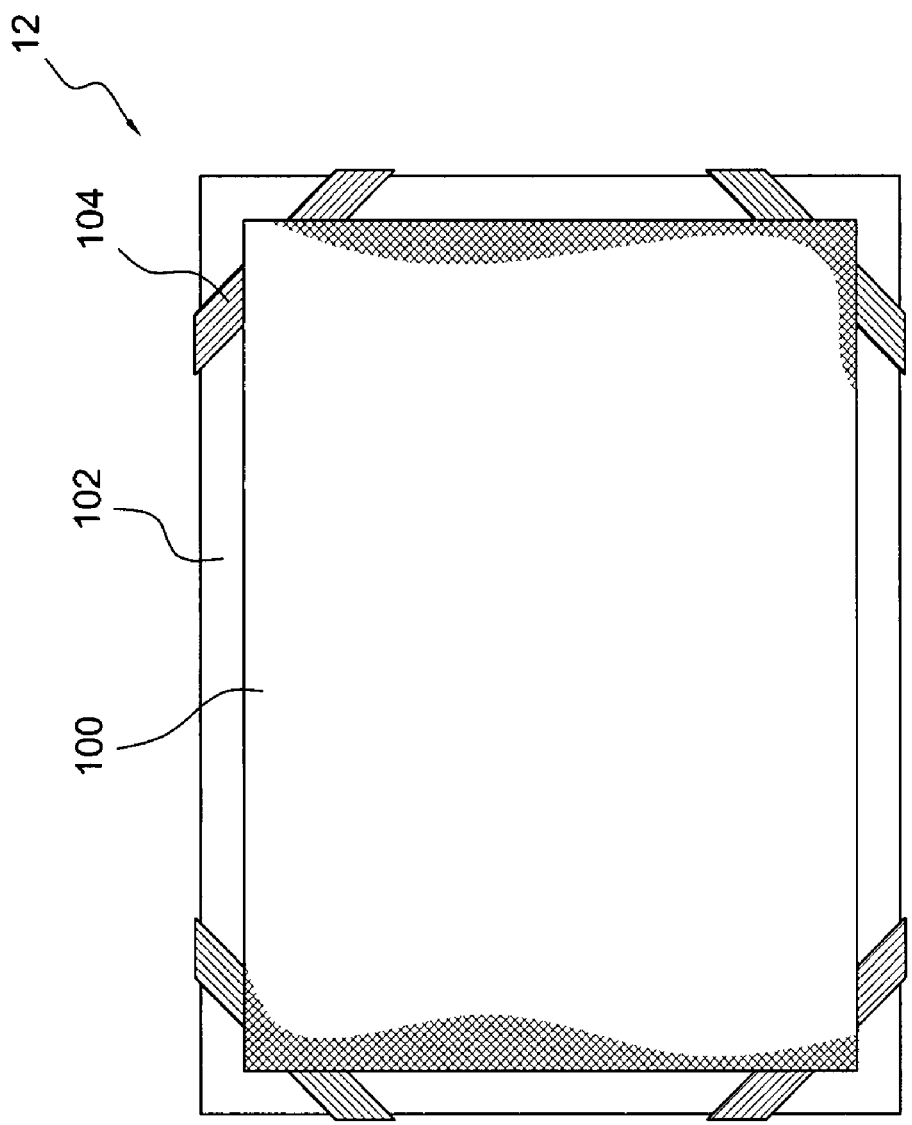
FIG. 8 is a schematic depiction of a flag or net that is usable with the collapsible frame of the present invention.

Referring initially to FIG. 1, there may be seen, generally at 10, a first preferred embodiment of a collapsible frame in accordance with the present invention. Frame 10 is generally rectangular in configuration and is adapted to support a plurality of flags and nets, such as the flag or net depicted generally at 12 in FIG. 8. As was discussed previously in the Summary of the Invention, such flags or nets as the one depicted schematically at 12 in FIG. 8 are an integral part of a grip toolkit. Grip equipment is a term used by lighting and imaging professionals to refer to any type of apparatus that shapes, modifies, alters or blocks light in any way. Grip equipment also includes stands, mounting hardware and other accouterments which hold, or support hits light-shaping or light-modifying equipment in a desired location or configuration so that it can perform its light-modifying task.

The flags or nets, which are an integral part of a grip toolkit, are comprised of various types of fabrics and materials which are stretched over suitable frames. In accordance with the present invention, a suitable grip toolkit could include one or more of the collapsible frames, such as the one depicted at 10 in FIG. 1 and one or more of the flags or nets depicted schematically at 12 in FIG. 8. The grip toolkit containing these frames and flags and/or nets could also include other suitable components that would be usable by a lighting and imaging professional to properly shape, modify, alter or block light. The grip toolkit which would include the collapsible frames, flags and/or nets, and other accessories, could be structured having pockets or receptacles in an overall fabric or cloth kit that could be folded, rolled or otherwise reduced in overall size to facilitate transport of the grip toolkit, as a complete unit, to any desired point of use. Once at such a point of use, the grip toolkit could be opened, the collapsible frame or frames could be unstowed and erected, the flags and/or nets could be attached to the erected or set-up frames and the frames could then be supported by generally known stands or other mounting hardware.

Referring again initially to FIG. 1, the collapsible frame, generally at 10 in accordance with the subject invention is depicted as a generally rectangular frame consisting of top and bottom rigid frame components, 14 and 16, and of right and left foldable frame components 18 and 20. It will be understood that the relative terms "top," "bottom," "left" and "right" are used for purposes of convenience and refer to the relative positions of the frame components of the collapsible frame, generally at 10, as seen in FIG. 1. They are not meant to limit the collapsible frame to a particular orientation or position.

The collapsible frame generally at 10 in FIG. 1 is depicted as being a rectangular or square frame. This is a shape that is typical in the industry because most flags and nets which are in use are also rectangular or square and are provided in sizes of 18"×24"; 24"×36" and 48"×48". Other shapes and sizes of collapsible frames are within the scope of the present invention. However, the sizes set forth above are the ones which most lighting and imaging professionals are comfortable working with.

Turning again to FIG. 1, and taken in conjunction with FIG. 4, each of the rigid frame components 14 and 16 is comprised of a pair of parallel frame rails 22 and 24, as seen in FIG. 4. It will be understood that the rigid component frame rail 24 is removed from each of the rigid frame components 14 and 16 depicted in FIG. 1 for purposes of illustration of the pivot pins and operation of the folding frame components, as will be discussed shortly.

Each rigid frame component rail 22, 24 has an elongated rail body 26. Each such rail body is preferably a light weight piece of metal or possibly plastic or a similar composite, that, in the preferred embodiment, is aluminum and has a length L of 24", a height H of 1"-2" and a thickness t of ⅛", as seen in FIG. 4. Each end of each rigid frame component frame rail has an inturned tab 28. These tabs are bent in at an angle of generally 90 degrees with respect to the respective frame rail 22, 24 and each tab 28 has a length I of approximately ¼", as seen in FIG. 4. Each of the cooperating rigid frame components frame rails 22 and 24 cooperate with each other to form a generally box-shaped rigid frame component 18 or 20, as seen most clearly in FIG. 4.

The two frame rails 22 and 24 of each of the rigid frame components 14 and 16 are connected to each other by fixed hinge pins 30 and 32. These fixed hinge pins 30 and 32 extend through the two frame components 14 and 16 just inboard of the respective end tabs 28. Each such hinge pin 30, 32 includes enlarged hinge pin heads 34, 36 and a fixed hinge pin shank 38. These fixed hinge pins 30, 32 are used to hold the rigid frame component frame rails 22 and 24 together, as well as to provide points of pivotal attachment of the foldable frame components 18 and 20 to the rigid frame components 14 and 16, as will be discussed shortly hereinafter.

Figure 2:
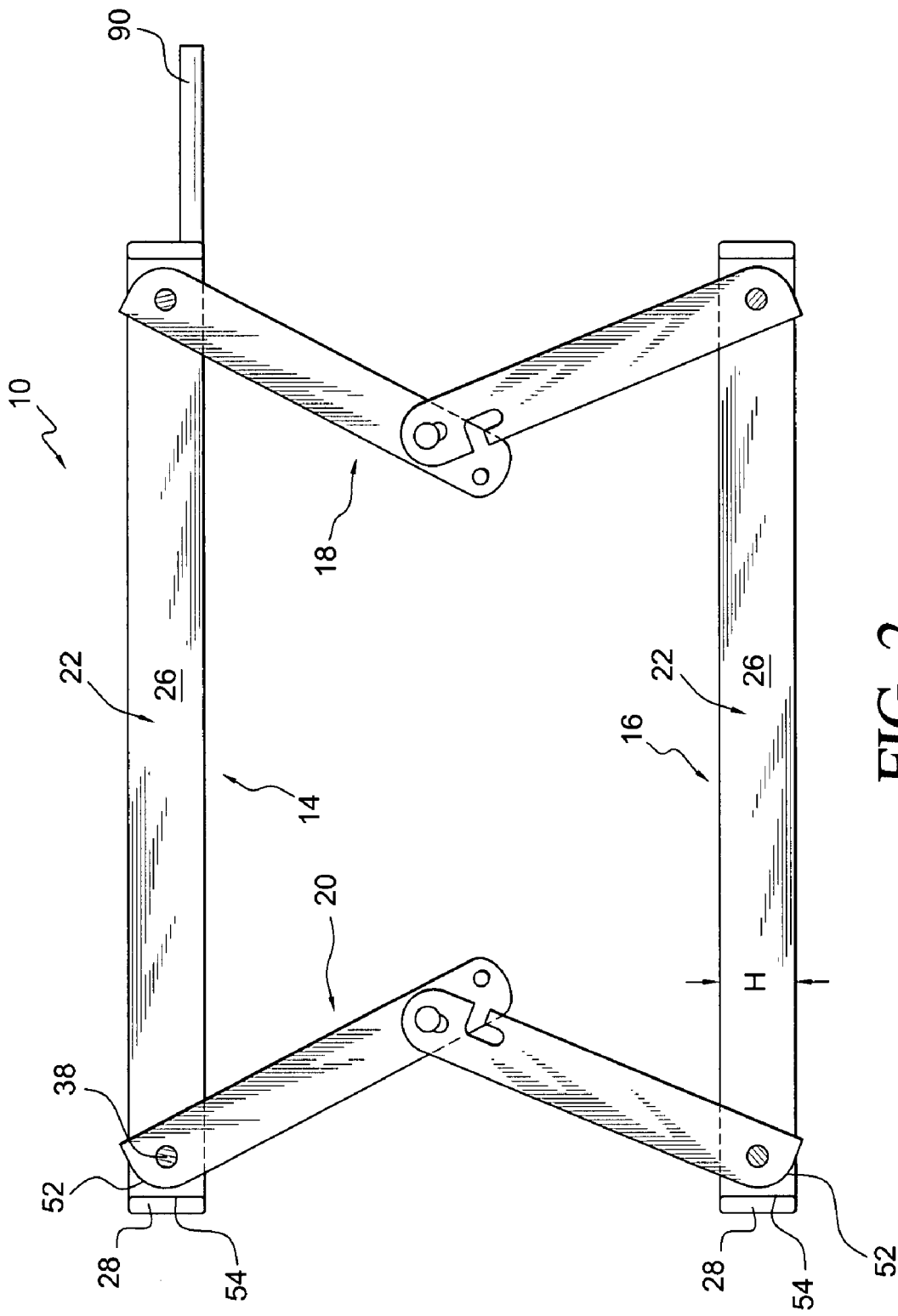
FIG. 2 is a side view, generally similar to FIG. 1, and showing the collapsible frame is a partially folded configuration.

Referring now to FIGS. 1-3, the collapsible frame, generally at 10, in accordance with the present invention uses a pair of foldable frame components, generally at 18 and 20, to transform the collapsible frame from the erected, in-use position, as depicted in FIG. 1, to a closed stowage or transport position, as depicted in FIGS. 4-7. FIG. 2 is a depiction of the collapsible frame, generally at 10, in a partially collapsed or partially erected position.

Each of the right and left foldable frame components 18 and 20 are essentially the same in structure and operation. They are mirror images of each other so that the following description of one of the two foldable frame components 18, 20 will effectively constitute a description of each of the foldable frame components 18, 20. Each foldable frame component 18, 20 is comprised of a pin frame member 40 and a slot frame member 42. As may be seen most clearly in FIGS. 1 and 2, each of the foldable frame component's pin and slot frame members 40 and 42 is made of the same material as is used to form the rigid frame component frame rails. Each of the pin and slot frame members 40 and 42 has a distal end 44, 46 that is provided with a fixed hinge pin receiving aperture 48. The fixed hinge pin shank 38 of each of the fixed hinge pins 30 and 32 passes through a respective fixed hinge pin receiving aperture 48 in the distal end 44, 46 of the respective one of the pin frame member 40 or the slot frame member 42 of the folding frame component 18 or 20. It will be understood that the shank 38 of the fixed hinge pins 30 and 32 are passed through the rigid frame components 14 and 16, and the pin frame numbers 40 and the slot frame numbers 42 during assembly of the overall collapsible frame 10 in accordance with the present invention.

As may be seen more clearly in FIGS. 1 and 2, each outbound portion of each distal end 44, 46 of each pin frame member 40 and of each slot frame member 42 has an arcuately shaped corner 50. This arcuately shaped corner 50 transitions into a planar outer wall 52. It is important that the planar outer wall 52 of the outbound side of the distal end 44, 46 of each of the pin frame elements 40 and the slot frame elements 42 is in abutting engagement with an inner wall 54 of each end tab 28 of each of the rigid frame component frame rails 22 and 24. This abutment of the outer wall 52 of the pin and slot frame numbers with the inner wall 54 of each of the tabs 28 serves to define the erected shape of the collapsible frame 10 in accordance with the present invention. As seen in FIG. 2, the curvature of the arcuately shaped outbound corner 50 of the distal end 44, 46 of each of the pin and slot frame numbers 40 and 42 of the foldable frame components 18 and 20, respectively is required to allow the collapsible frame, generally at 10 to assume its collapsed position, as seen in FIG. 4.

Turning now to the detailed view of FIG. 3, the proximal end 60 of the pin frame member 40 carries a movable hinge pin 62 and a locking pin 64. As can be seen, the locking pin 64 is closer to the proximal end 60 than is the movable hinge pin 62. It will be understood that the movable hinge pin 62 moves with the pin frame member 40, as that frame number pivots about its connection to the fixed hinge pin 30 or 32. The movable hinge pin 62 does not move with respect to the pin frame member 40 itself.

A proximal end 70 of each slot frame member, generally at 42 of each of the foldable frame components 18 and 20 has a hinge pin slot 72 and a locking pin slot 74. The hinge pin slot 72 is an elongated slot so that it is generally ovoid in plan view, as seen in FIG. 3. A shank portion of the movable hinge pin 62 is received in the hinge pin slot 72. The movable hinge pin 62 may be formed with an enlarged head 76 that will insure that the movable hinge pin 62 is relaxed in its hinge pin slot 74. The locking pin slot 74 is a dog-leg slot as seen in the most detail in FIG. 3. It has a locking pin entry and exit opening 78 that connects with a locking pin retention well 80.

In operation, as seen in FIG. 3, the rigid frame components 14 and 16 are grasped manually and are moved apart. This movement extends the foldable frame components from their stowed positions, as depicted in FIG. 4, where the pin frame member 40 and the slot frame member 42 are parallel to each other and are adjacent to each other; to their erected position, where the pin frame member 40 and the slot frame member 42 are aligned end to end to form each of the right and left foldable frame components 18 and 20 respectively. As the pin frame member 40 and the slot frame member 42 move to their erected positions, as depicted on FIG. 1, the locking pin 64 will initially enter the locking pin entry and exit opening 78 and will then pass to the locking pin retention well 80 of the locking pin slot 74. As may be seen in FIG. 3, the movable hinge pin 62 and the locking pin 64 may be slightly offset with respect to each other and to a center line of the pin frame member 40. In the same manner, the movable hinge pin slot 72 and the locking pin slot 74 may be slightly offset with respect to each other and with respect to a center line of the slot frame member 42. The result is a somewhat overcenter arrangement of the two members 40, 42 that constitute the right and left foldable frame components 18 and 20. This overcenter arrangement means that the collapsible frame, generally at 10, will remain in its erected position, as depicted in FIG. 1 until it is desired to fold or compact the collapsible frame 10 to the stowage configuration, as depicted in FIG. 4. The provision of the elongated hinge pin slot 72 and of the dog-leg locking pin slot 74 allow this overcenter orientation of the foldable frame components. Since, in such an overcenter position, the foldable frame components bow slightly outwardly or beyond a central alignment, the collapsible frame 10 could be considered as being slightly six-sided. This overcenter configuration is so slight that it is not evident in FIG. 1.

The collapsible frame, generally at 10, has a handle or a moving rod, generally at 90, as seen in particular in FIGS. 5 and 6. As may be there seen, handle or moving rod is secured to the rigid frame component 18. The handle or moving rod 90 can be attached to the frame rail 22 by the use of suitable screws 92 or by other conventional partners. While the handle or moving rod 90 is depicted simply as a cylindrical member, it could take on any suitable shape or configuration commensurate with its use. For example, if the flag or net that is to be attached to, or mounted on the collapsible frame 10 is intended to be hand-held, the handle 10 could be shaped to adapt it to being comfortably gripped and held. If the flag or net is intended to be mounted on a stand or on a support, the handle 90 could be shaped so that it would cooperatively engage a socket in such a stand or support.

As mentioned previously, a flag or net that is usable with the collapsible frame 10 of the present invention, is depicted schematically at 12 in FIG. 8. The flag or net is comprised of a suitable light modifying, altering or blocking material generally at 100. That material 100 may be any one of a silk, a diffuser, a solid, a scrim, a bounce, a metallic or a breakup pattern or cucoloris, as these materials are understood by lighting and imaging professionals.

The material 100 is typically flexible and foldable so that it can be part of the portable flag and net but in accordance with the present invention. A perimeter of webbing 102 is attached about the edges of the material, typically by sewing. The web 102 may be approximately ¾" to 1" in width. Elastic corners 104 are sewn or otherwise joined 6 to the webbing 102. It will be understood that the elastic corners 104 will be rigid so that they can receive the ends of the top and bottom rigid frame components 14 and 16; i.e. the ends of the rigid frame component frame rails 22 and 24 at the end tabs 28. It will also be understood that the overall sizes of the flags or nets, generally at 12 will be such that they will be placed slightly in tension when the collapsible frame 10, to which they are attached, has been fully opened or erected. That tension, possibly also in conjunction with an overcenter arrangement of the foldable frame component 18 and 20, as discussed above, will insure that once the fabric net or flag 12 has been attached to the collapsible frame 10, that the resultant light modifying grip equipment will maintain its erected shape.

Figure 9:
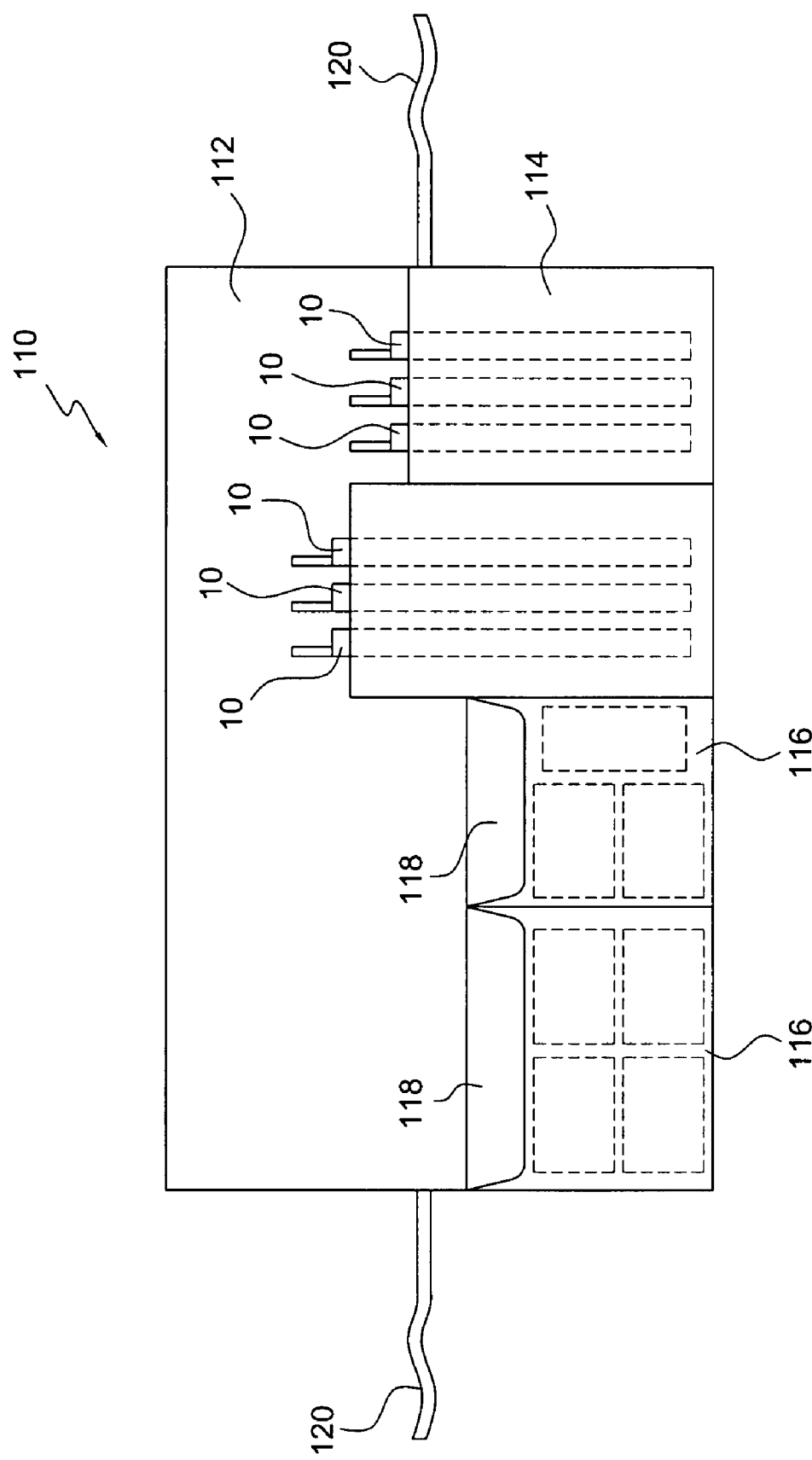
FIG. 9 is a schematic depiction of a portable flag and net kit in accordance with the present invention.

A lighting or imaging professional may utilize a portable kit, generally at 110 in FIG. 9 in accordance with the present invention to provide suitable grip equipment, in the form of flags and nets at any desired location. A suitable portable kit could utilize a cloth or fabric roll or container 112 that is provided with a number of large pockets 114 of sizes that would accept collapsed frames 10 of varying sizes in accordance with the present invention. Other, smaller protective pockets 116, with protective closure flaps 118 may optionally be provided to store various flags or nets, generally at 12. If desired, the cloth or fabric 112 of the kit 110 could be provided with the straps 120 so that the entire kit 110 could be rolled up on itself and secured in a rolled, compact configuration. It will be understood that the kit 110 depicted in FIG. 9 is intended to be exemplary of a variety of kits that could be provided to facilitate the storage and transport of the collapsible frames 10 and the flags or nets 12. The kit provided in accordance with the present invention optionally includes a selection of frames of different sizes and a selection of flags or nets including silks, diffusers, solids, scrims, bounces, metallics or cucoloris, as these materials are used by lighting and imaging professionals, all carried in transportable, protective roll or container 112.

In use, the lighting or imaging professional selects from the afore-described items to stock a kit 110 with the appropriate collapsible frames 10 and flags or nets 12 anticipated as needed at a particular location. The kit 110 could then be easily carried to any desired location and opened. The required number and sizes of collapsible frames 10 could be removed from the kit and could be used to stretch and support the appropriate nets or flags 12, as discussed above. Such flags and/or nets, with their frames could be hand-held or could be supported by suitable frames. Once the need for the grip equipment at a particular location had ended, the frames 10 could be collapsed, the nets or flags 12 removed, and the various components returned to their kit 110 for transport and storage until they are needed again.

It will be appreciated by those having skill in the art that the present invention makes a durable, portable kit 110 available for the lighting or imaging professional intending to work on location or in the studio. Broadly speaking, kit 110 includes at least a first collapsible frame 10 adapted to support a light modifying flag or a light modifying net (e.g., 100) where the frame includes first and second rigid frame components 22, 24 carrying fixed hinge pins 38 that connect spaced ends of the first and second rigid frame components. Rigid frame components 22, 24 are connected at each end to first and second foldable frame components 18, 20 extending between the fixed hinge pins of the first and second rigid frame components at the first and second ends of the first and second rigid frame component frame rails. A pin frame member 40 and a cooperating slot frame member 42 form each of the foldable frame components, and each pin and slot frame member have a distal end connected to one of the fixed hinge pins 38. A movable hinge pin 62 and a locking pin 64 are carried on each pin frame member 40, and a movable hinge pin slot 72 and locking pin receiving slot 78 are defined in each slot frame member 42, where the slots are adapted to receive the movable hinge pin and locking pin when the collapsible frame is in an erected position.

The collapsible frame defines rigid frame components and foldable frame components with frame ends, and, in kit 110 at least one light modifying flexible material segment has frame end receiving portions such as straps 104 or corner pockets. The collapsible frame has a first erected size and the flexible material segment has a second size not greater than said first size so that the collapsible frame, when erected, permits a user to place the flexible material flag or net under tension upon the frame.

While preferred embodiments of collapsible frames, flags and nets and a portable kit, all in accordance with the present invention, have been set forth fully and completely hereinabove, it will be apparent to one of skill in the art that various changes in, for example, the number and sizes of the collapsible frames, the specific materials used for the nets and flags and the like could be made without departing from the true spirit and scope of the present invention.

Having described preferred embodiments of a new and improved grip apparatus and method, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A portable kit of grip equipment for shaping or modifying light when performing lighting or imaging work, comprising:

a first collapsible frame adapted to support a light modifying flag or a light modifying net including first and second rigid frame components, each rigid frame component having spaced first and second rigid frame component frame rails; fixed hinge pins connecting spaced ends of said first and second rigid frame component frame rails of each of said first and second rigid frame components;

first and second foldable frame components extending between said fixed hinge pins of said first and second rigid frame components at said first and second ends of said first and second rigid frame component frame rails;

a pin frame member and a cooperating slot frame member forming each said foldable frame component, each said pin and slot frame member having a distal end connected to one of said fixed hinge pins; a movable hinge pin and a locking pin on each said pin frame number;

a movable hinge pin slot and locking pin receiving slot on each said slot frame member, said slots being adapted to receive said movable hinge pin and said locking pin when said collapsible frame is in an erected position;

wherein said collapsible frame defines rigid frame components and foldable frame components with frame ends;

at least one light modifying flexible material segment having frame end receiving portions;

wherein said collapsible frame has a first erected size and said flexible material segment has a second size not greater than said first size; and said collapsible frame, when erected, permits a user to place said flexible material flag or net under tension upon said frame.

2. The portable kit of grip equipment of claim 1, wherein said collapsible frame, when erected, provides a substantially rectangular support having a long side dimension that is approximately 24 inches and a short side dimension that is approximately 18 inches.

3. The portable kit of grip equipment of claim 1, wherein said collapsible frame, when erected, provides a substantially rectangular support having a long side dimension that is approximately 36 inches and a short side dimension that is approximately 24 inches.

4. The portable kit of grip equipment of claim 1, wherein said collapsible frame, when erected, provides a substantially square support having four sides that are approximately 48 inches in length.

5. The portable kit of grip equipment of claim 1, wherein said light modifying flexible material segment comprises a flag.

6. The portable kit of grip equipment of claim 1, wherein said light modifying flexible material segment comprises a net.

7. The portable kit of grip equipment of claim 1, wherein said light modifying flexible material segment comprises a silk adapted to diffuse or spread light.

8. The portable kit of grip equipment of claim 1, wherein said light modifying flexible material segment comprises a diffuser having a selected density adapted to diffuse and spread light.

9. The portable kit of grip equipment of claim 1, wherein said light modifying flexible material segment comprises a solid flag adapted to block light.

10. The portable kit of grip equipment of claim 1, wherein said light modifying flexible material segment comprises a scrim net, having a selected number of layers, adapted to reduce a light source's intensity without changing the light's color or shape.

11. The portable kit of grip equipment of claim 1, wherein said light modifying flexible material segment comprises a bounce, adapted to bounce or reflect light to provide additional illumination.

12. The portable kit of grip equipment of claim 1, wherein said light modifying flexible material segment comprises a gold or silver metallic surface adapted to reflect light.

13. The portable kit of grip equipment of claim 1, wherein said light modifying flexible material segment comprises a break-up pattern or cucoloris.

14. The portable kit of grip equipment of claim 1, wherein said light modifying flexible material segment comprises a task-specific gel or colored gel.

15. The portable kit of grip equipment of claim 1, further comprising a second collapsible frame, wherein said first and second are each selected from a plurality of frame sizes; and wherein said kit further includes a second light modifying flexible material segment, and wherein each of the light modifying flexible material segments is selected from a plurality of flags or nets adapted to shape, modify, alter, reflect or block light.

16. A portable, collapsible frame adapted to support a light modifying flag or a light modifying net comprising;

first and second rigid frame components, each having spaced first and second rigid frame component frame rails;

fixed hinge pins connecting spaced ends of said first and second rigid frame component frame rails of each of said first and second rigid frame components;

first and second foldable frame components extending between said fixed hinge pins of said first and second rigid frame components at said first and second ends of said first and second rigid frame component frame rails;

a pin frame member and a cooperating slot frame member forming each said foldable frame component, each said pin and slot frame member having a distal end connected to one of said fixed hinge pins;

a movable hinge pin and a locking pin on each said pin frame member; and a movable hinge pin slot and locking pin recurring slot on each said slot frame member, said slots being adapted to receive said movable hinge pin and said locking pin when said collapsible frame is in an erected position.

17. The portable frame of claim 16, wherein said collapsible frame, when erected, provides a substantially rectangular support having a long side dimension that is approximately 24 inches and a short side dimension that is approximately 18 inches.

18. The portable frame of claim 16, wherein said collapsible frame, when erected, provides a substantially rectangular support having a long side dimension that is approximately 36 inches and a short side dimension that is approximately 24 inches.

* * * * *